B. DAHL.
MECHANICALLY ADJUSTABLE RESILIENT TIRE.
APPLICATION FILED JUNE 1, 1908.
983,878.
Patented Feb. 14, 1911.
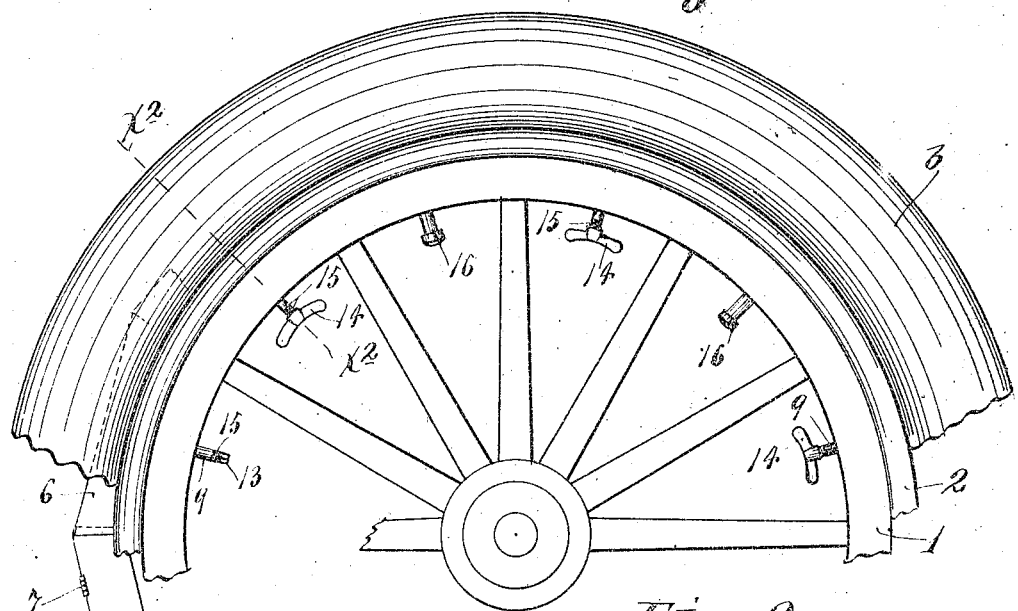
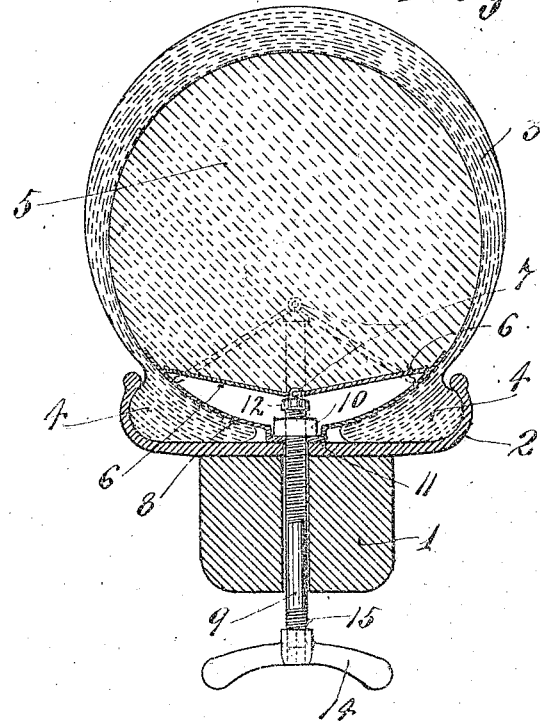
Witnesses.
A. H. Opsahl.
W. H. Souba.
Inventor
Benjamin Dahl
By his Attorneys
Williamson Merchant

UNITED STATES PATENT OFFICE.

BENJAMIN DAHL, OF MINNEAPOLIS, MINNESOTA.

MECHANICALLY-ADJUSTABLE RESILIENT TIRE.

983,878.      Specification of Letters Patent.    Patented Feb. 14, 1911.

Application filed June 1, 1908. Serial No. 435,961.

*To all whom it may concern:*

Be it known that I, BENJAMIN DAHL, a citizen of the United States, residing at Minneapolis, in the county of Hennepin and State of Minnesota, have invented certain new and useful Improvements in Mechanically-Adjustable Resilient Tires; and I do hereby declare the following to be a full, clear, and exact description of the invention, such as will enable others skilled in the art to which it appertains to make and use the same.

My invention relates to resilient tires and has for its object to provide improved means whereby, without the use of a pneumatic tube, a tire of rubber or other elastic material may be put under varying tension so it will properly sustain its load and still have the desired resilience.

To the above ends the invention consists of the novel devices and combinations of devices hereinafter described and defined in the claim.

In the accompanying drawings which illustrate the invention, like characters indicate like parts throughout the several views.

Referring to the drawings, Figure 1 is a side elevation, with some parts broken away, showing a wheel, such as an automobile wheel, equipped with a tire designed in accordance with my invention, and Fig. 2 is a transverse section taken on the line $x^2 x^2$ of Fig. 1.

The numeral 1 indicates a wheel having the usual wooden felly to which is applied a channel shaped metal rim 2.

The tire has an outer sheath 3 which is much like the outer sheath of a double-tubed pneumatic tire, and is provided on its inturned edges with solid ribs 4 that are adapted to interlock with the in-turned flanges of the metal wheel rim 2 when the said sheath is put under expanding pressure. The sheath 3 is provided with an internal filler 5 of soft sponge-like rubber or similar elastic material, which normally nearly or quite fills the said sheath. The mechanical expander comprises a multiplicity of metallic blades or wings 6, the abutting edges of which are hinged together at 7, and the free edges of which work slidably upon a concave channel-shaped sheath clamping plate 8. This sheath clamping plate 8 is preferably made in a single piece, but it may be made up of a multiplicity of sections. When applied, as shown in the drawings, it holds the edge ribs 4 of the sheath 3 interlocked with the flanges of the metal rim 2. The expanding blades 6 are arranged in overlapping sections which make up a complete or endless expander. For each pair of hinged expanding blades 6 there is an expanding screw 9, which, as shown, works freely through coincident perforations in the clamping plate 8, in the metal rim 2, and in the wooden felly of the wheel 1, all as best shown in Fig. 2. The threaded inner ends of the screws 9 work through nuts 10 fitted in seats 11 of the clamping plate 8 and held against rotation thereby so as to afford bases of reaction for said expanding screws. At their extreme inner ends the said screws 9 are preferably provided with heads 12 that directly engage the intermediate portions of the hinge joints 7 of the coöperating pairs of expanding blades 6. The inwardly projecting and exposed ends of the adjusting screws 9 are provided with angular shanks 13 to which keys or operating hand-pieces 14 are adapted to be detachably applied for the purpose of turning the said screw. As shown, the screws 9 are provided with threads 15 just inward of their shanks 13, to which protecting caps 16 are applied, as shown in several instances in Fig. 1.

As is evident, when the expanding blades 6 are moved into or toward the positions indicated by dotted lines in Fig. 2, the elastic filler 5 will, of course, be pressed outward and put under increased pressure, and this, of course, results in the application of an expanding pressure against the sheath 3. In this way, as is evident, a complete tire may be set under varying tension, that is, may be made more or less solid, according to the extent of the load which is to be carried by the wheel. It also of course follows that by these adjustments the resilience of the tire may be varied.

What I claim is:

In a resilient tire, the combination with a sheath and an elastic filler therefor, of an adjustable mechanical expander comprising a pair of pivotally connected metallic blades working within said sheath, and a screw operative on the hinged edges of said blades to force the same against said filler and thereby vary the pressure of the latter on the said sheath.

In testimony whereof I affix my signature in presence of two witnesses.

BENJAMIN DAHL.

Witnesses:
 HARRY D. KILGORE,
 MALIE HOEL.